(12) United States Patent
Buehring

(10) Patent No.: US 12,723,606 B2
(45) **Date of Patent: *Sep. 1, 2026**

(54) SYSTEM, METHOD, APPARATUS, DEVICE AND KIT FOR CONTAINING OIL DURING A HYDRAULIC PURGE

(71) Applicant: Ralph C. Buehring, Portland, TX (US)

(72) Inventor: Ralph C. Buehring, Portland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/342,935

(22) Filed: Sep. 29, 2025

(65) Prior Publication Data

US 2026/0029004 A1 Jan. 29, 2026

Related U.S. Application Data

(63) Continuation of application No. 18/370,311, filed on Sep. 19, 2023, now Pat. No. 12,429,076.

(60) Provisional application No. 63/415,770, filed on Oct. 13, 2022.

(51) Int. Cl.

| | |
|---|---|
| ***F15B 21/044*** | (2019.01) |
| ***F15B 21/00*** | (2006.01) |
| ***F16D 125/16*** | (2012.01) |

(52) U.S. Cl.
CPC .......... *F15B 21/044* (2013.01); *F15B 21/005* (2013.01); *F16D 2125/16* (2013.01)

(58) Field of Classification Search
CPC ...... F15B 21/044; F15B 21/005; F15B 21/04; F15B 2101/30; F15B 1/26; F16D 2125/16; F16D 2125/02; F16K 24/04; B01D 19/00; B60T 17/004
USPC ........................................ 222/396, 394, 397
See application file for complete search history.

(56) References Cited

U.S. PATENT DOCUMENTS

2016/0138649 A1* 5/2016 Anderson ............. E21B 43/267 384/107

* cited by examiner

*Primary Examiner* — David J Walczak
(74) *Attorney, Agent, or Firm* — Raymond Van Dyke; Van Dyke Intellectual Property Law

(57) ABSTRACT

A system, device, apparatus, methodology, technique and kit that allow a party to more effectively purge a hydraulic system of trapped air, along with any residual oil. The configuration of the present invention, which connects to the external hydraulic system, collects the residual oil in an accumulation chamber with transparent sides. A worker can thus see the progress of the hydraulic purge and easily dispose of the oil without mess and exposure.

20 Claims, 10 Drawing Sheets

120
126
122
124

126
128
B
B
130

128
132
126
122
130
134
124

126
130
134
124

238
236
200
204
202
238

208
240
238
206
204
238
200
202

236
238
204
238
202
210

A
A
208
240
238

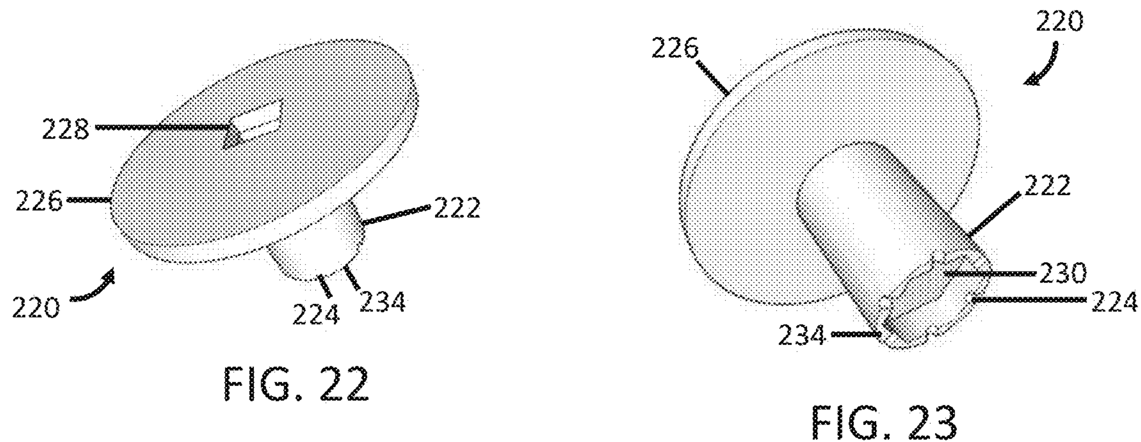
FIG. 22
FIG. 23
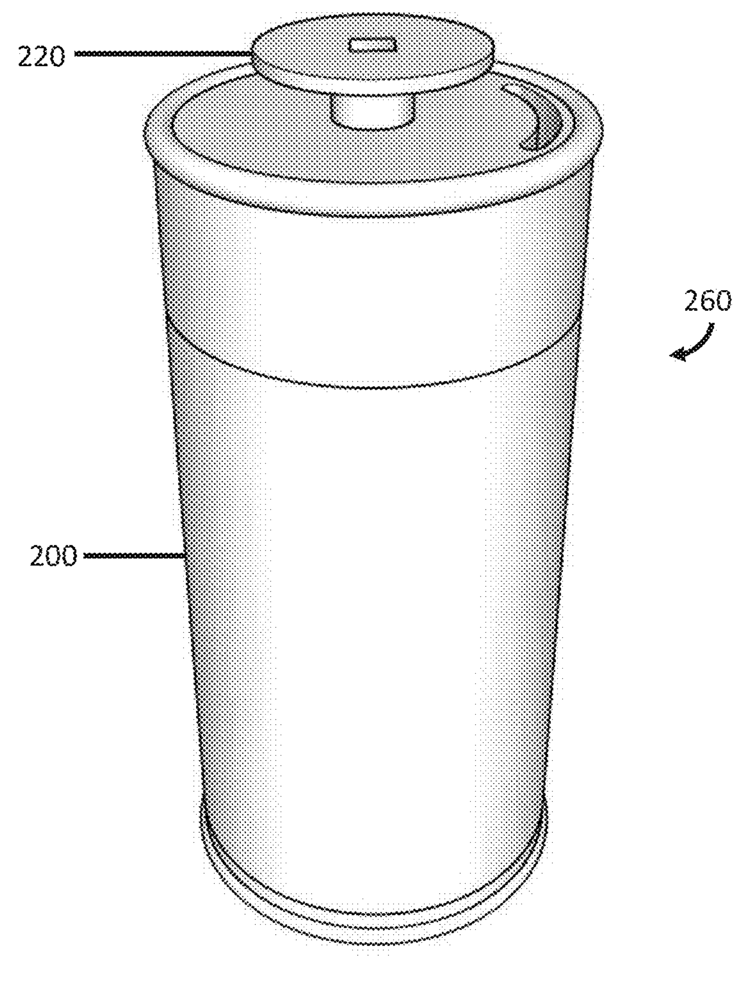
FIG. 24

SYSTEM, METHOD, APPARATUS, DEVICE AND KIT FOR CONTAINING OIL DURING A HYDRAULIC PURGE

CROSS REFERENCE TO RELATED APPLICATION

The present invention is a Continuation of U.S. patent application Ser. No. 18/370,311, filed Sep. 19, 2023, now U.S. Pat. No. 12,429,076, which is a nonprovisional of and claims priority to U.S. Provisional Patent Application Ser. No. 63/415,770, filed Oct. 13, 2022, all entitled "SYSTEM, METHOD, APPARATUS, DEVICE AND KIT FOR CONTAINING OIL DURING A HYDRAULIC PURGE," the disclosures of which are incorporated herein by reference.

FIELD OF THE INVENTION

The present invention is directed to improvements in techniques and equipment for trapping, containing and accumulating oil residue during a hydraulic system purge.

BACKGROUND OF INVENTION

Current methods of purging air from lift cylinders and other devices that contain oil, transmission fluid or other residues are inadequate. For example, current single acting hydraulic lift cylinders mounted in above ground hydraulically operated vehicle lifts utilize shop rags or other absorbent cloth to shield the technician and to absorb the hydraulic oil or automatic transmission fluid which escapes during the purge process. For example, current methods of purging, involve "bleeding" air from single acting hydraulic lift cylinders, a technique which has several shortcomings and inadequacies, including safety, functionality, cleanliness, environmental, unnecessary use of shop supplies, wasted time, and other problems noted in more detail hereinbelow.

In particular, during the process of purging air from single acting hydraulic lift cylinders, inadequate shielding and absorption of the hydraulic oil or automatic transmission fluid, which escapes during the purging process, creates at least two safety problems; a) the likely bodily contact with the escaping hydraulic oil or automatic transmission fluid and, b) a slip and fall hazard due to unabsorbed hydraulic oil or automatic transmission fluid leaking out, spraying or otherwise escaping on the floor or work surfaces. With federal and other environmental or other regulations applying, any improved technique that minimizes harmful spills and messes over these prior art methods is desired.

Another functionality inadequacy of present air purge methods is the inability to view the escaping hydraulic oil or automatic transmission fluid during the process, which can cause an additional safety problem of incomplete air purging from the single acting hydraulic lift cylinder or other devices being purged. For example, incomplete air purging from the cylinder will likely cause the lift to operate erratically, which could cause a vehicle to shift or fall from the lift, creating dangerous scenarios.

Complete purging of air trapped inside a single acting hydraulic lift cylinder or other like device is essential for safe, smooth, and properly operating assemblies, such as above ground hydraulically operated automotive lifts.

It is an object of the present invention to address the inadequate ability of present air purge methods to contain escaping fluids, such as hydraulic oil or automatic transmission fluid, creates a cleanliness problem due to escaping hydraulic oil or automatic transmission fluid contact with the surrounding lift surfaces.

It is another object of the present invention to address the inadequate ability of present air purge methods to accumulate the escaping hydraulic oil or automatic transmission fluid for disposal results in inadequate and environmentally unfriendly disposal of the escaped hydraulic oil or automatic transmission fluid, creating possibly hazardous workplace conditions.

It is a still further object of the present invention to address the inadequate ability of present purge methods causes unnecessary usage of shop supplies such as rags, absorbent cloth, and oil absorbents for the floor. The inadequate ability of present techniques increases air purging time and results in unnecessary time used for the cleanup of spilled oil.

Despite all of these known and acknowledged deficiencies of the prior art, there have been few advancements addressing these structural and operational problems.

There is, therefore, a present need to provide a system, device, apparatus, methodology and kit to improve existing ways to clean or purge hydraulic systems of residue oil, transmission fluid and other fluids.

SUMMARY OF THE PRESENT INVENTION

The present invention is directed to solving a variety of safety problems of bodily contact, slip-and-fall, and erratic lift operation, cleanliness, and environmental problems by trapping, containing, and accumulating escaping oil or other fluids during a purge for easy, proper, thorough, and environmentally friendly disposal. The instant invention solves the functionality problem of the prior art through innovative designs and techniques or methods for the capture, creating a means to capture and collect oil or other liquids expelled in the purge process. The instant invention further solves the problems of the prior art by instituting unobstructed clear visual access to the user of the escaping oil so as to clearly determine when all the air has been purged from the single acting hydraulic lift cylinder. The instant invention also saves time in the air purge process and in the avoidance of the cleanup of spilled oil.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

Figures 1, 2, 3, 4:
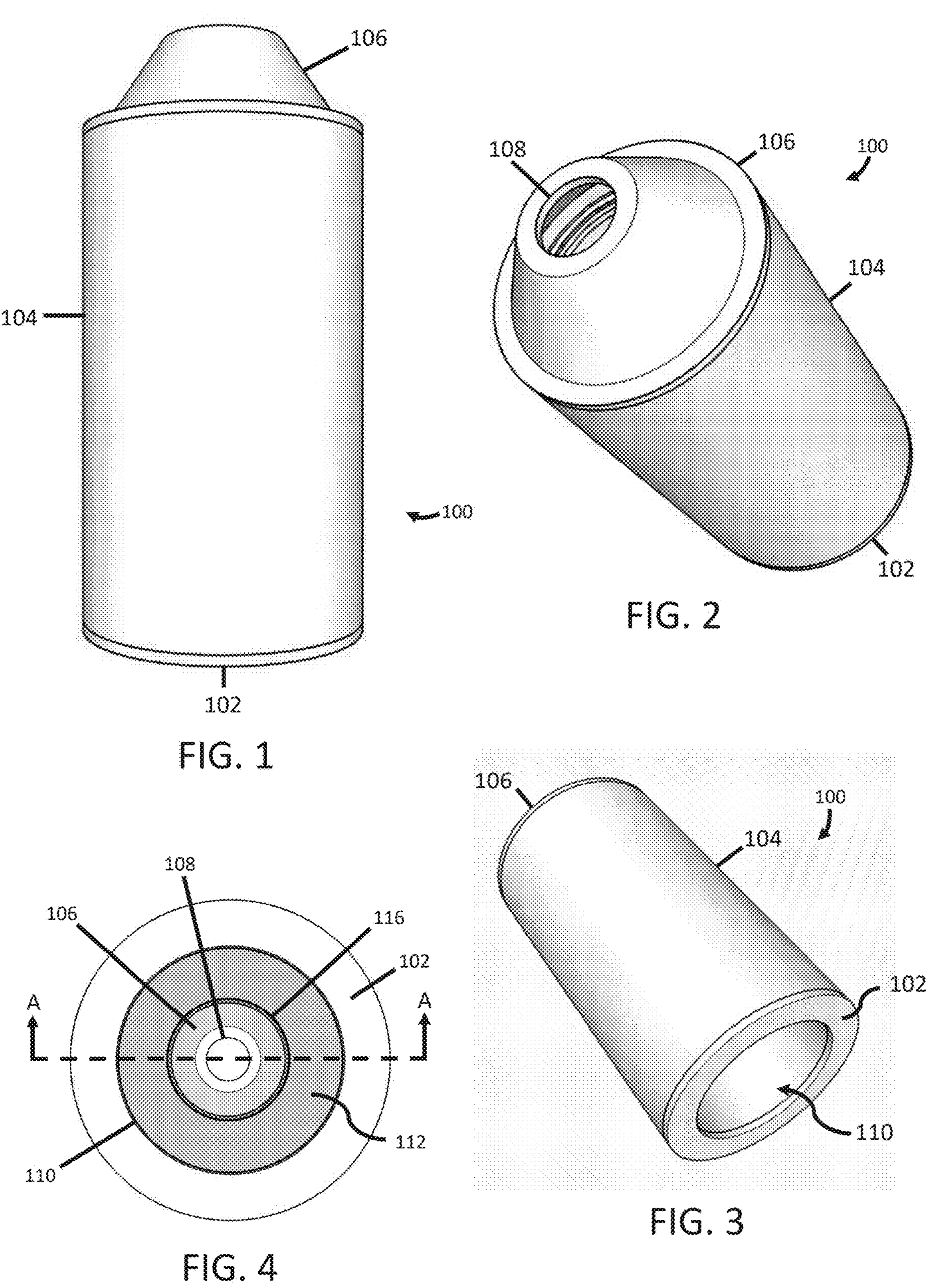
FIG. 1 is a representative view of a visual purge containment and accumulation container or device that may be employed using the principles of the present invention in a first embodiment.
FIG. 2 is a representative view of the device shown in FIG. 1 employing the principles of the present invention along an upper side perspective view thereof.
FIG. 3 is a further representative view of the device shown in FIGS. 1 and 2 employing the principles of the present invention in a different and lower side perspective view.
FIG. 4 is a representative axial perspective view of the component embodiment of the apparatus or device of FIGS.
Figure 5:
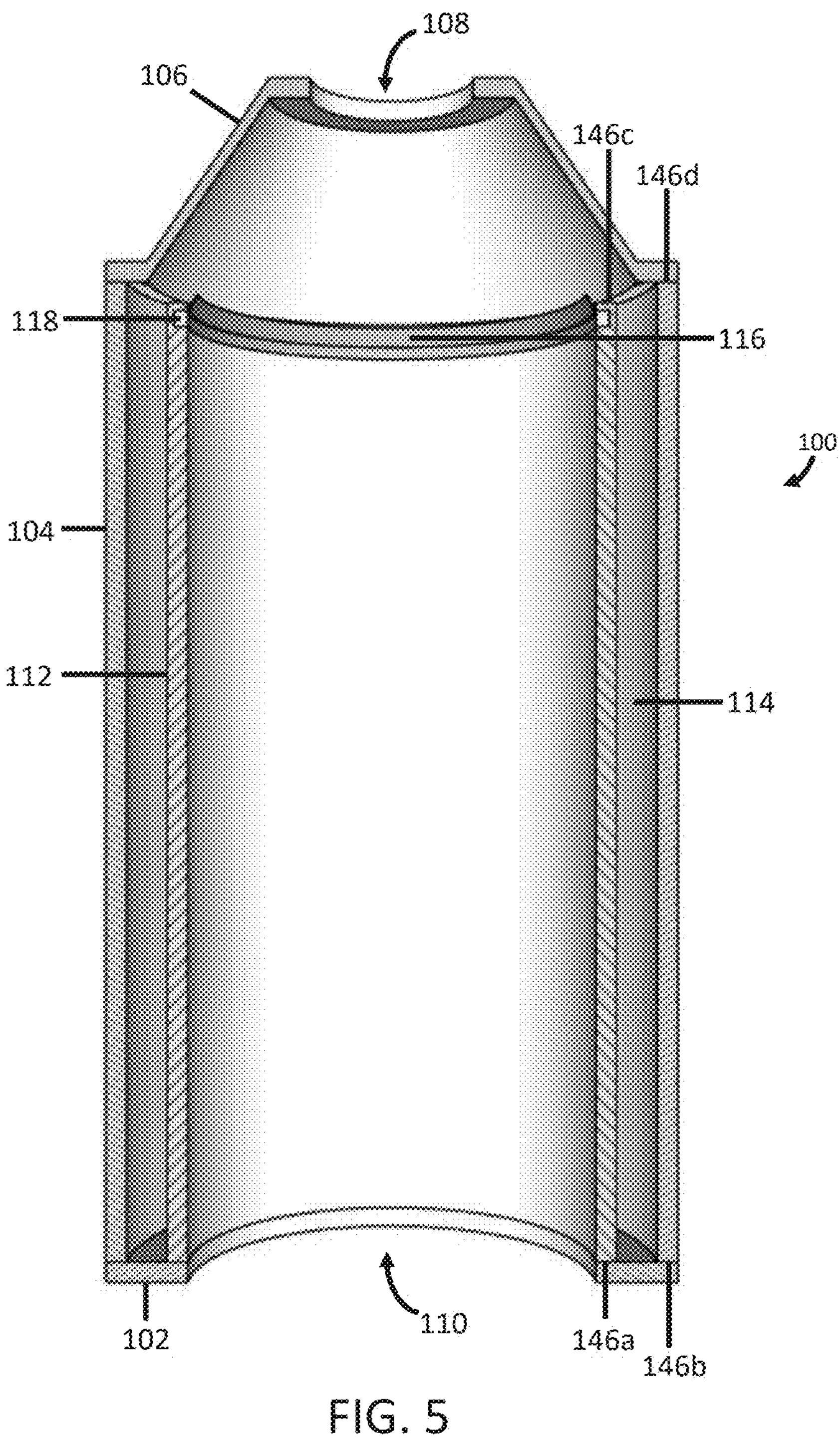
Figures 6, 7, 8, 9:
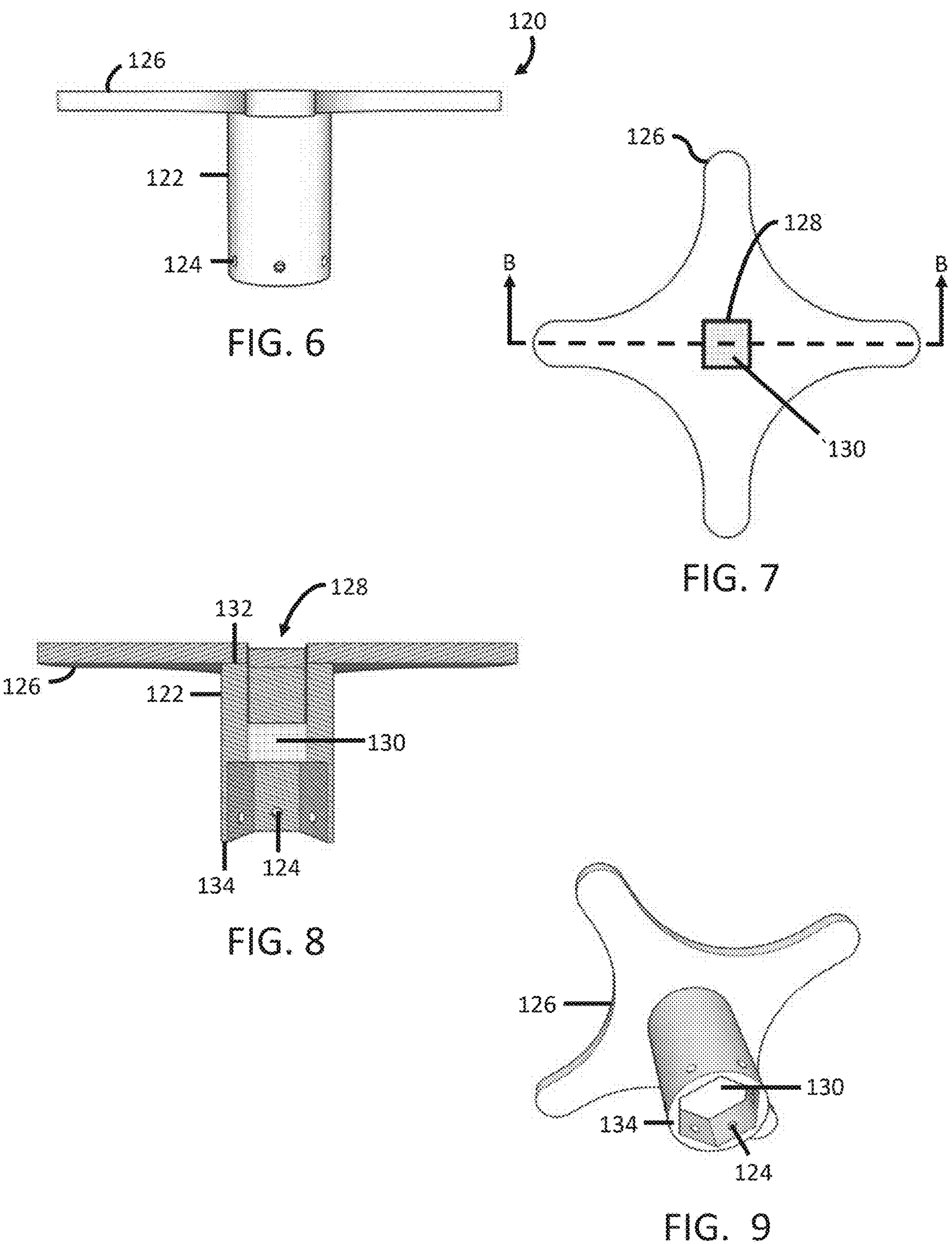
Figure 10:
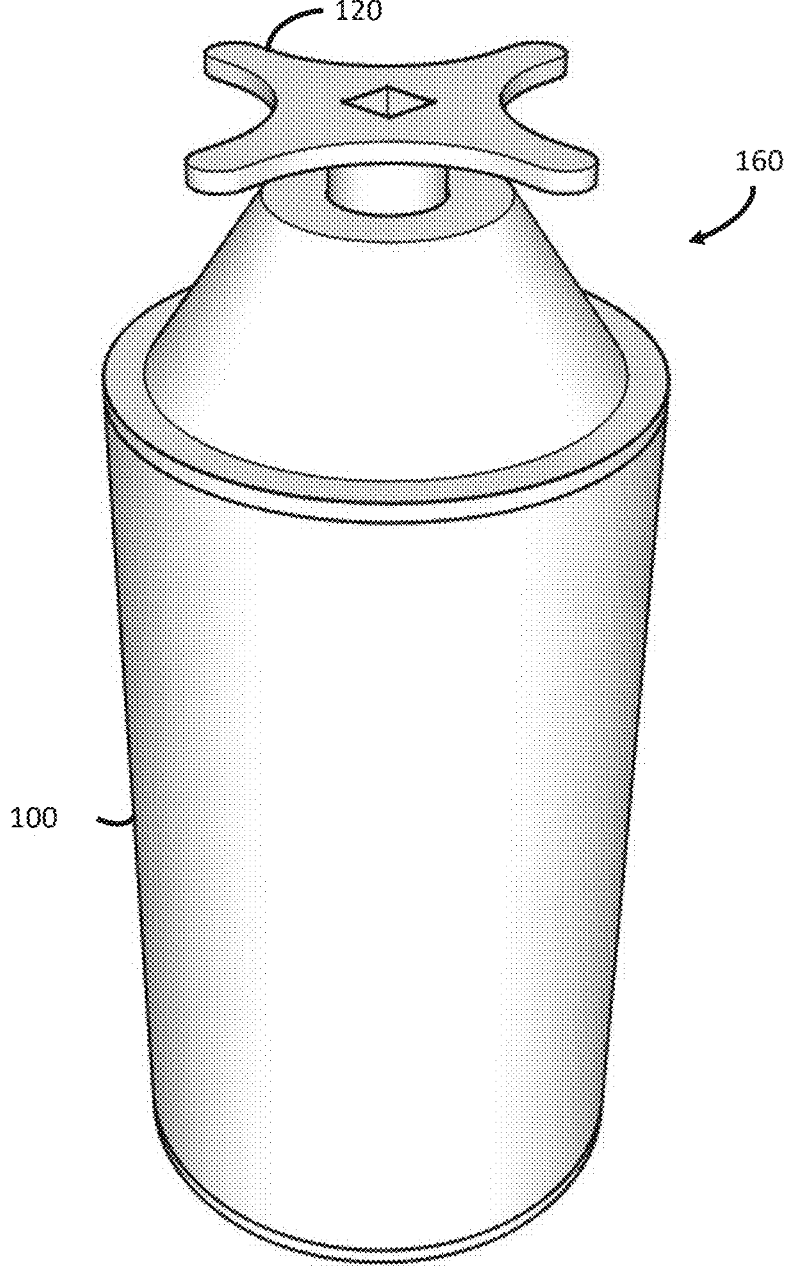
Figures 11, 12, 13, 14:
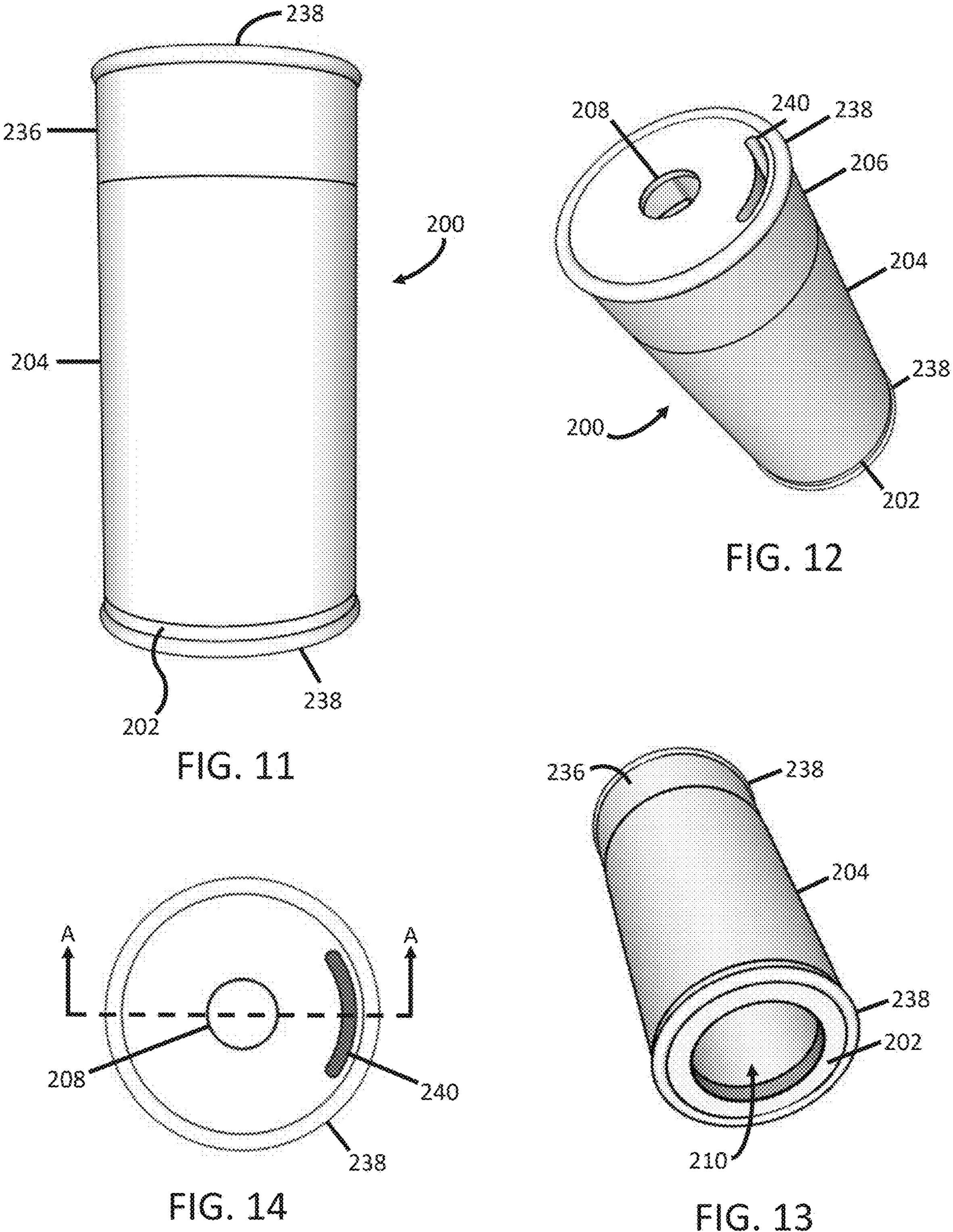
Figures 15, 16:
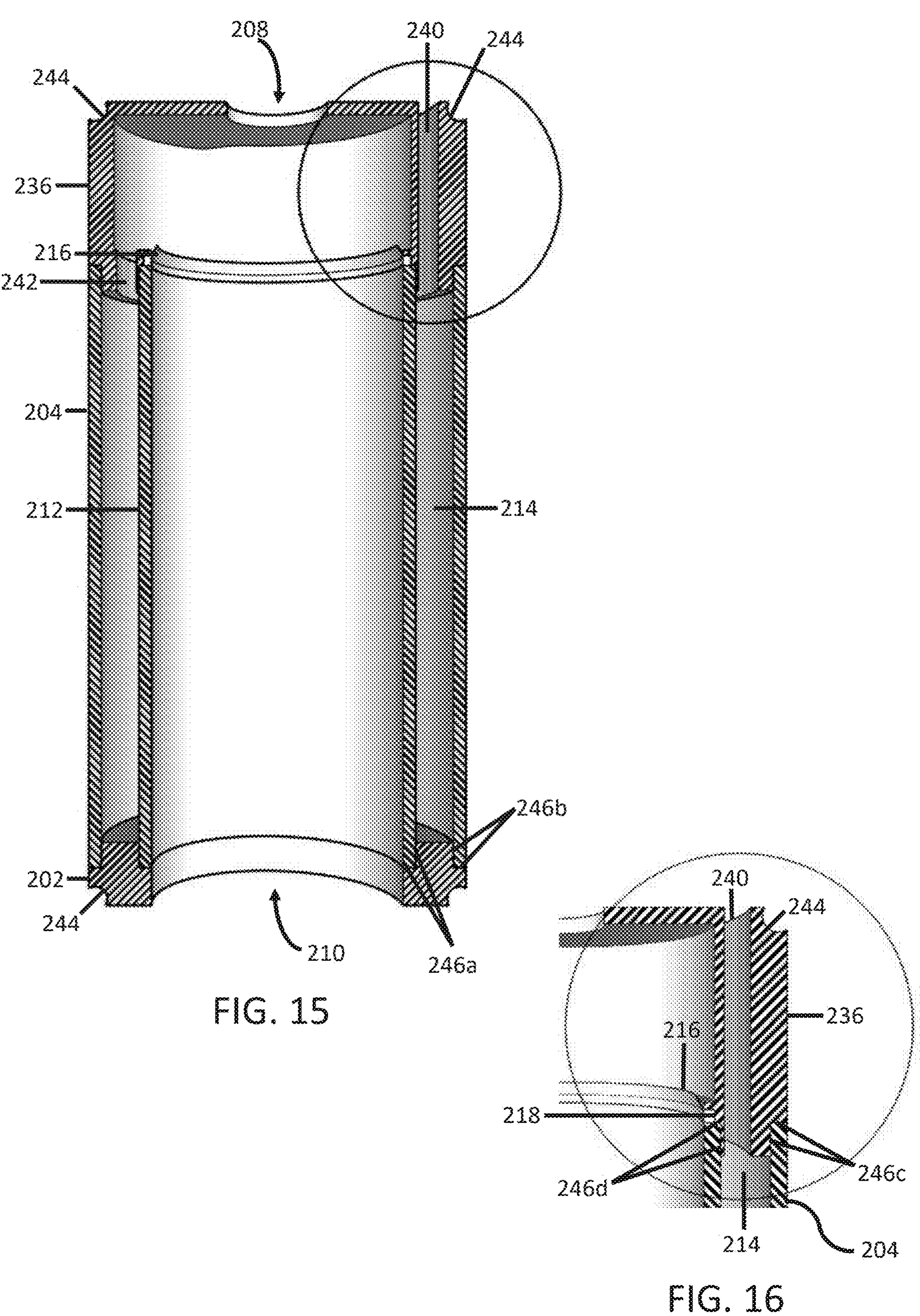
Figures 17, 18, 19, 20, 21:
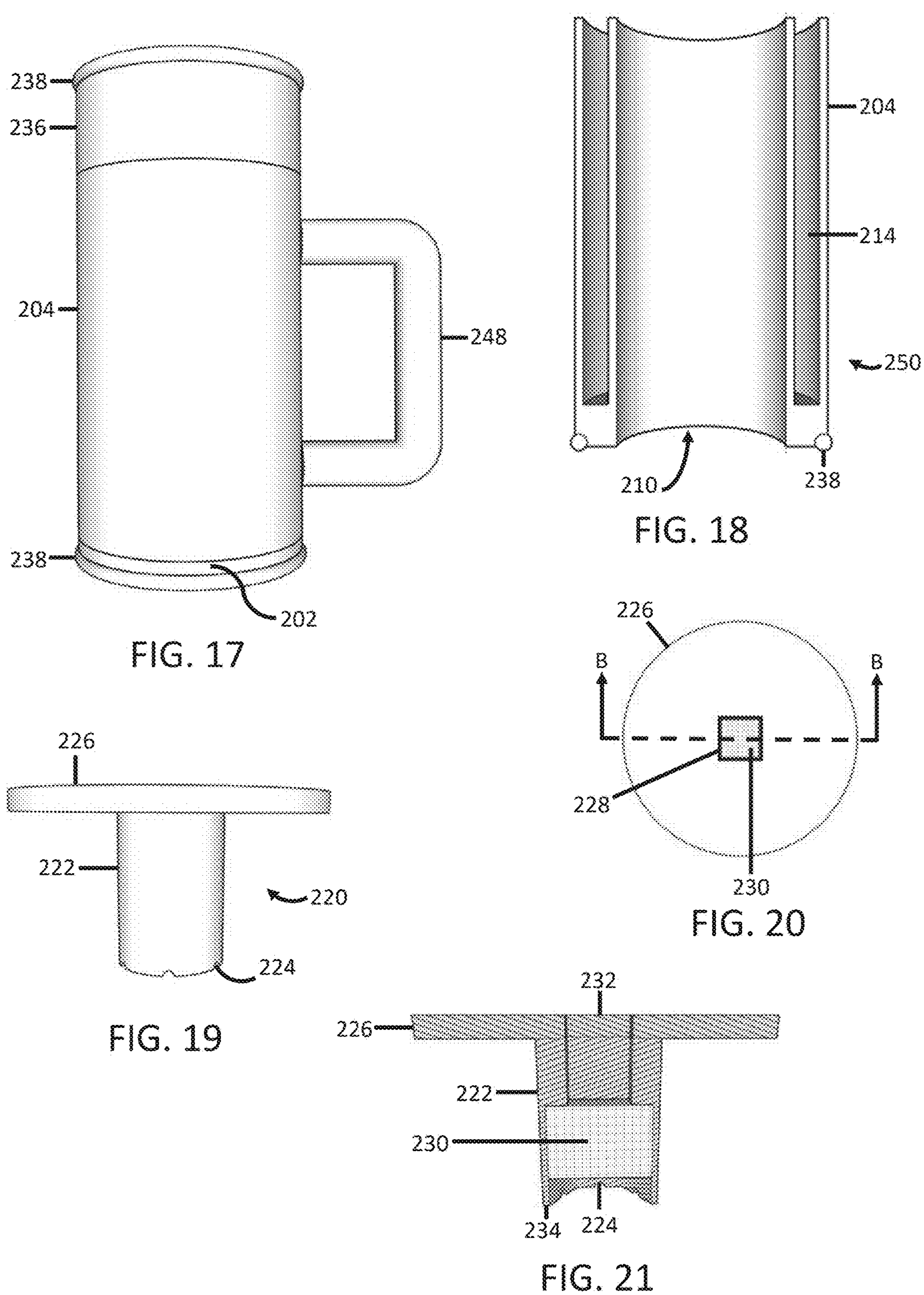
Figures 25, 26:
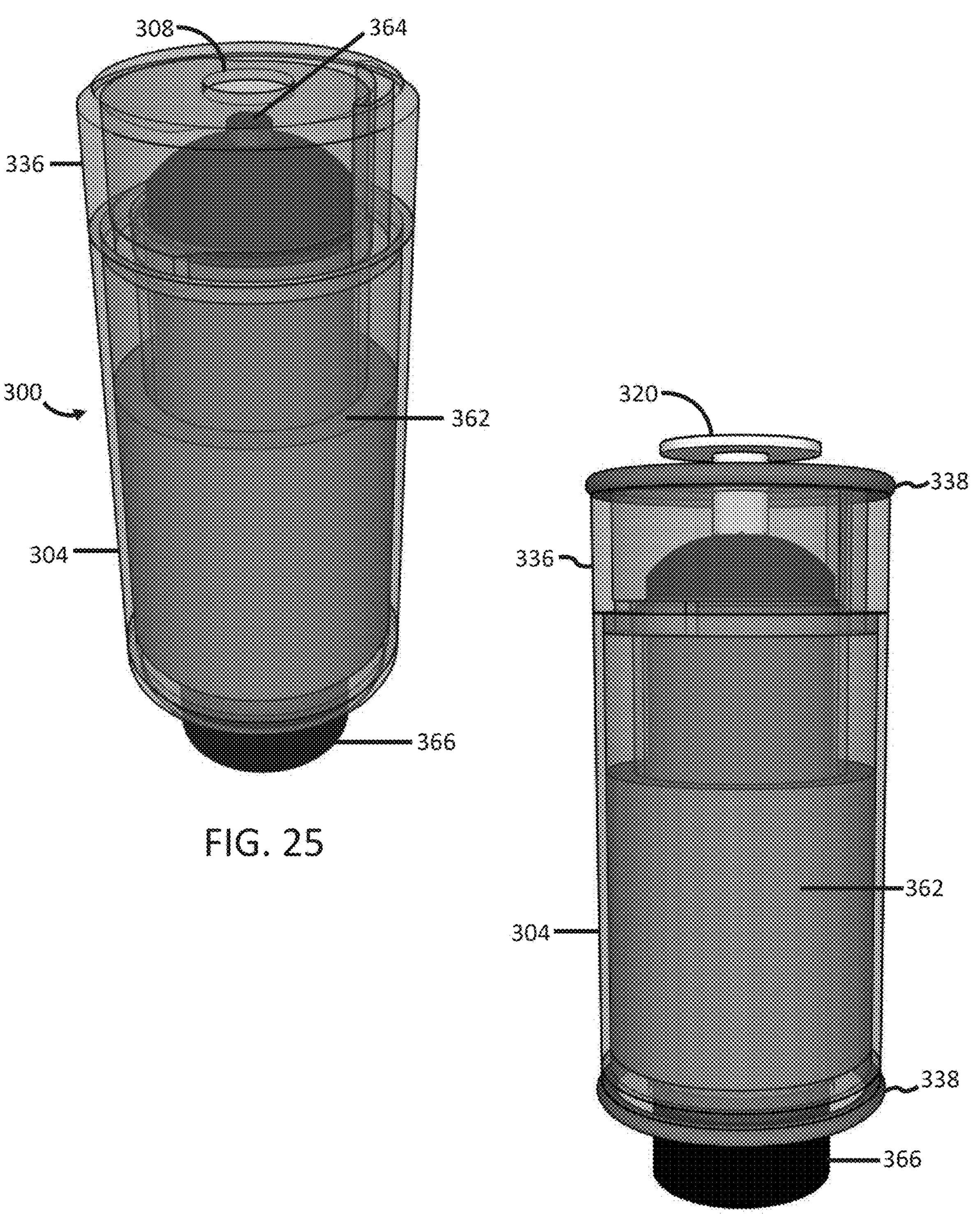
Figure 27:
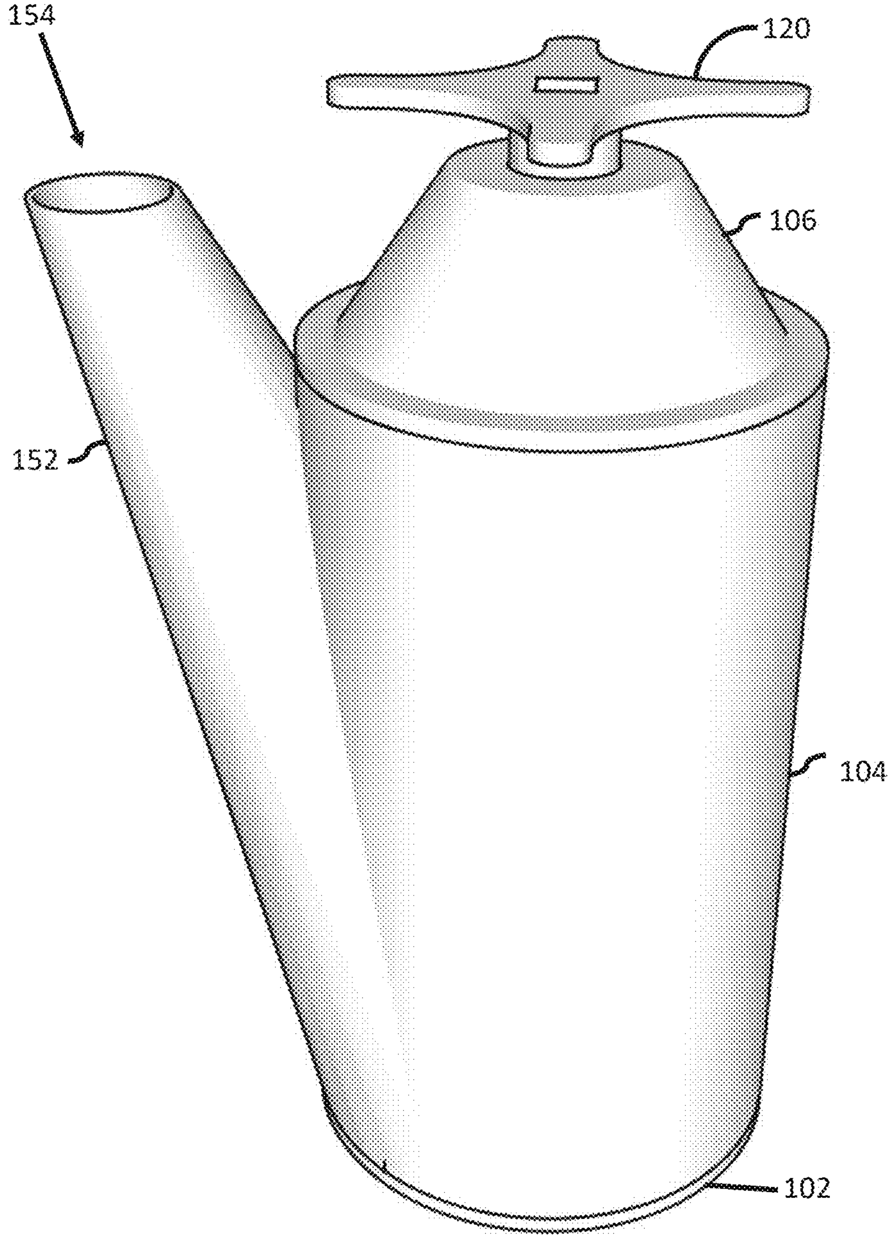

1-3 employing the principles of the present invention in a preferred configuration, including a cross-sectional indicator therein;

FIG. 5 is a cross-sectional view of the component embodiment of the apparatus or device of FIGS. 1-4 employing the principles of the present invention;

FIG. 6 is a representative view of a second component device that may be employed in conjunction with the container component or device embodiments shown in FIGS. 1-5 using the principles of the present invention;

FIG. 7 is a representative axial view of and cross-sectional indication for the component embodiment of the apparatus or device of FIG. 6 employing the principles of the present invention in a preferred configuration;

FIG. 8 is a cross-sectional view of the component embodiment of the apparatus or device of FIGS. 6 and 7 employing the principles of the present invention;

FIG. 9 is a further representative view of the device shown in FIGS. 6-8 employing the principles of the present invention in a lower side perspective view;

FIG. 10 is a representational view of the assemblage of the components, such as employed in practicing the principles of the present invention, e.g., a container and a plug portion, as shown in FIGS. 1-9 hereinabove, in a first embodiment;

FIG. 11 is a representative view of another visual purge containment and accumulation container or device that may be employed using the principles of the present invention in a second and presently preferred embodiment;

FIG. 12 is a representative view of the device shown in FIG. 11 employing the principles of the present invention along an upper side perspective view thereof;

FIG. 13 is a further representative view of the device shown in FIGS. 1 and 12 employing the principles of the present invention in a different and under side perspective view;

FIG. 14 is a further representative axial view of and cross-sectional indication for the device shown in FIGS. 11-13 employing the principles of the present invention;

FIG. 15 is a cross-sectional view of the component embodiment of the apparatus or device of FIGS. 11-14 employing the principles of the present invention;

FIG. 16 is a further cross-sectional view of a portion of the device shown in FIG. 15;

FIG. 17 is an exemplary alternate configuration of the present invention;

FIG. 18 is an exemplary and unitary configuration of a component for the present invention made pursuant to another manufacturing technique;

FIG. 19 is a representative view of a second component device that may be employed using the principles of the present invention in conjunction with the container or device shown in FIGS. 1-18;

FIG. 20 is a representative axial view of and cross-sectional indicator for the component embodiment of the apparatus or device of FIG. 19 employing the principles of the present invention in a preferred configuration;

FIG. 21 is a cross-sectional view of the component embodiment of the apparatus or device of FIGS. 19 and 20 employing the principles of the present invention;

FIG. 22 is a further representative view of the device shown in FIGS. 19-21 employing the principles of the present invention along an upper side perspective view;

FIG. 23 is another representative view of the device shown in FIGS. 19-22 employing the principles of the present invention along a different and under side perspective view;

FIG. 24 is a representational view of the assemblage of the components such as employed in practicing the principles of the present invention, e.g., in FIGS. 11-23 hereinabove, in a second embodiment;

FIG. 25 is an exemplary preferred embodiment of the configuration shown in FIG. 10 in operation with a number of transparent parts; and FIG. 26 is another exemplary preferred embodiment of the configuration shown in FIG. 25 with a number of transparent parts in an air purge operation; and FIG. 27 is an exemplary alternate configuration of the present invention depicted in FIGS. 1-10.

DETAILED DESCRIPTION OF THE PRESENT INVENTION

The present invention will now be described more fully hereinafter with reference to the aforementioned and accompanying DRAWINGS, in which several preferred embodiments of the invention are shown. It is, of course, understood that this invention may, however, be embodied in several alternate configurations or forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized, and structural changes can be made without departing from the scope of the present invention.

Again, the present invention, as shown in the DRAWINGS and described herein, is generally directed to an improved apparatus, device, system, kit and technique for use during an air purging and cleanly collecting residual oil or other fluids in the purge process, as compared to existing messy techniques (requiring cleanup with shop rags or absorbent cloth). The improvements of the instant invention enable the user to perform the task of purging air from system, e.g., a single acting hydraulic lift cylinder, faster, easier, more safely, and in an environmentally friendly manner.

Another advantage due to the improvements set forth in the instant invention is visual observation of the process. Through the use of some or all transparent components, this enables the user to easily, clearly, dynamically and safely view and evaluate the escaping hydraulic oil or automatic transmission fluid for air content. It enables the user to avoid spills by the device or container being configured to capture, contain, and accumulate the escaping hydraulic oil or automatic transmission fluid during an air purging.

The instant invention also enables the user to dispose of the captured hydraulic oil or automatic transmission fluid in a proper and an environmentally friendly manner. As will be shown, the instant invention is a time and shop supplies saver during the air purge process, as well as eliminating the unnecessary shop supply and time usage caused by having to clean up spilled oil or other noxious liquids.

As discussed, problems with current methods include inadequate capturing and containment of escaping hydraulic oil or automatic transmission fluid, additional time to complete the air purge process due to the inability to safely, clearly, dynamically, and transparently view the escaping hydraulic oil or automatic transmission fluid to assess for remaining air content therein.

Spillage, for example, causes considerable wasted time spent in cleaning up the spill and assessing air content of the escaping hydraulic oil or transmission fluid, creates the unnecessary consumption of cleanup and oil absorption products, which causes unnecessary generation of landfill waste materials, and prevents one simply disposing the oil in a proper and environmentally friendly manner.

With reference now to FIG. 1 of the DRAWINGS, there is illustrated a representative configuration of a container or container component in a first embodiment of an improved air purge/oil collection apparatus practicing the principles of the present invention. The exemplary container configuration shown in FIG. 1 is generally designated by the reference numeral 100.

As shown, the container 100 is cylindrical in shape and has an annular bottom disk, generally designated by the reference numeral 102, discussed in more detail hereinbelow. As shown, the container 100 has an outer cylinder, generally designated by the reference numeral 104, discussed in more detail hereinbelow, where the outer cylinder 104 annularly connects to the aforesaid bottom disk 102.

Also shown is a top cone, generally designated by the reference numeral 106, which is configured to be sized to and atop the outer cylinder 104 annularly and attached or otherwise secured thereto, as discussed in more detail hereinbelow. In other words, the diameter of the top cone 106 base is substantially the same as the diameter of the outer cylinder 104 and configured to be affixable thereto.

With reference now to FIG. 2 of the DRAWINGS, there is illustrated another representative configuration of the aforesaid container 100 in a perspective view of the first embodiment of an improved oil purge collection apparatus shown in FIG. 1, viewing the container 100 along a top or upper end thereof. As shown, the container 100 has an aperture, generally designated by the reference numeral 108, centrally located at the top, and discussed in more detail hereinbelow. This aperture 108 is to receive another component shown and described hereinbelow in connection with FIGS. 6-9 (and FIGS. 19-23) discussed infra.

With reference now to FIG. 3 of the DRAWINGS, there is illustrated another representative configuration of the container 100 in another perspective view of the first embodiment of an improved oil purge collection apparatus shown in FIGS. 1 and 2, viewing the component 100 along the other end and underside. As shown, the cylindrical outer cylinder 104 has an opening at the bottom end thereof, as shown the opening generally designated by the reference numeral 110 and discussed in more detail hereinbelow.

With reference now to FIG. 4 of the DRAWINGS, there is illustrated the aforementioned configuration of the container 100 in the first embodiment of an improved oil purge collection apparatus shown in FIGS. 1-3, shown in perspective and oriented to view axially or perpendicularly into the container 100 through the end opening 110, which is also shown and described hereinabove in connection with FIG. 3, and looking into the cylindrical space therein, which will receive a respective hydraulic lift cylinder therein, as illustrated and described in more detail hereinbelow, into the inner cylinder 112, shown in perspective. As shown, the aperture 108 at the top of said top cone 106 and therethrough is also shown and discussed in more detail hereinbelow.

With reference now to FIG. 5 of the DRAWINGS, there is illustrated another representative configuration of the container 100 of the first embodiment, particularly as shown in FIG. 4, where a cross-sectional view of the container component 100 is taken along the indicated A-A line, bisecting the cylindrical structure.

As shown in the cross-section, the container 100 has an inner cylindrical structure, generally designated by the reference numeral 112, within the aforesaid outer cylinder 104, and discussed in more detail hereinbelow. Both the inner 112 and outer 104 cylinders are connected to the aforesaid annular bottom disk 102, as discussed in more detail herein, forming an accumulation chamber, generally designated by the reference numeral 114, therebetween and open at the other end, e.g., to receive residual oil or other fluids during a purge. As also shown in the cross-section, the component 100 has an annular lip seal, generally designated by the reference numeral 116, such as a rubber seal. The aforementioned inner cylinder 112 has a lip seal groove therethrough, generally designated by the reference numeral 118, which receives the aforesaid lip seal 116 therein.

Also shown in FIG. 5 are adhesive sealant locations, i.e., joinders of component parts that require sealant to secure them properly, a sealant generally designated herein by the reference numeral 146. In FIG. 5, for example, the joinders of the inner 112 and outer 104 cylinders to the bottom disc 102 are secured with the aforementioned sealant 146 applied thereto, e.g., at annular junctures 146*a* and 146*b*, thereby sealing the bottom of the aforementioned accumulation chamber 114. Also shown is the joining of the outer cylinder 104 to the top cone 106 with adhesive sealant 146, e.g., at juncture 146*d*, as shown. See FIG. 15 for more description and illustration on the aforesaid junctures 146.

In a preferred embodiment, outer cylinder 104 and the top cone 106 (in another embodiment) are transparent, allowing a user to see therethrough, e.g., as oil accumulates within the accumulation chamber 114. In other words, the user can see the amount oil or other fluid therein, as well as the progress of the air purge, e.g., assessing the rate of increase or decrease of the air, indicating the state of the air purge. In another preferred embodiment, the inner cylinder 112 is also transparent, allowing viewing the hydraulic lift cylinder within the bore of the inner cylindrical structure 112. See, e.g., FIGS. 25 and 26 infra for a further description and illustration of this embodiment. It should be understood that the bore size of the inner cylinder 112 is configured to tightly and securely receive the hydraulic lift cylinder 366, as discussed in more detail hereinbelow.

With reference now to FIG. 6 of the DRAWINGS, there is illustrated another component in the first embodiment of an improved oil purge collection apparatus, a plug portion, generally designated by the reference numeral 120, which is used with the aforesaid first container 100 shown and described hereinabove in connection with FIGS. 1-5, and conjoinable, adaptable or configurable to combine together, e.g., as illustrated and described in connection with FIGS. 10 and 24, as well as FIGS. 25 and 26 demonstrating the invention in operation.

As shown, the second component 120 has a socket portion, generally designated by the reference numeral 122, and discussed in more detail hereinbelow, where the socket portion is configured to tightly and securely insert into the aforesaid aperture 108 and engage a bleed screw 364 (shown in FIGS. 25 and 26), which is atop the aforesaid hydraulic lift cylinder 366.

As shown the socket portion 122 has a plurality of drain openings therethrough, generally designated by the reference numeral 124 and discussed in more detail hereinbelow, thereby allowing air and residual oil or other fluids to pass therethrough, e.g., into the accumulation chamber 114. Also, the component 120 has a handle portion 126 at the top, which a user may employ to insert, remove and manipulate the second component 120 vis-à-vis the first container 100 during the purge process.

With reference now to FIG. 7 of the DRAWINGS, there is illustrated a representative view of the component 120 shown in FIG. 6, the view looking perpendicularly downward on said handle portion 126. As shown, the handle portion 126 has an aperture therein, generally designated by the reference numeral 128, discussed in more detail hereinbelow. It should be understood that the aperture 128 may have a square, pentagon, hexagonal or other configuration useful to engage with and manipulate the handle portion 126, e.g., by using an external tool, such as a socket wrench (not shown) to tighten or loosen the handle portion 126 further than the user can turn by hand. Inside said aperture 128, also shown in FIG. 8, there is illustrated a sealant member, generally designated by the reference numeral 130, discussed in more detail hereinbelow, which is a bolus or construct of material that seals and separates the exterior space from the interior space, i.e., the space within the cylinders 112 and 104 of the first container 100.

With reference now to FIG. 8 of the DRAWINGS, there is illustrated another representative configuration of the second component 120 in the embodiment shown in FIGS. 6 and 7, which is a cross-sectional view of the component along the B-B line illustrated, bisecting the second component 120.

As shown in the cross-section, the second component 120 has a driving end, generally designated by the reference numeral 132, i.e., the direction for the force imposed on the second component 120 (e.g., receiving the force by application of a socket wrench or other tool) and at the other end a driven end, generally designated by the reference numeral 134, i.e., the direction being imposed by that force, both discussed in more detail hereinbelow. The sealant member 130 is shown blocking the aperture 128 roughly halfway down the socket portion 122.

With reference now to FIG. 9 of the DRAWINGS, there is illustrated another representative and perspective view configuration of the second component 120 in the embodiment shown in FIGS. 6-8, taken along an underside perspective. Rotation of the handle portion 126 by hand or by the aforementioned tool drives the driven end 134 of the second component 120 into the first container 100, particularly the configuration of the underside space determines the engagement with the aforementioned bleed screw, discussed hereinbelow. Here, the configuration is preferably hexagonal and particularly configured to securely engage the head of a ⅝" or ⅝ inch or other size hex head of the bleed screw. See, FIGS. 25 and 26 and associated text hereinbelow for more.

With reference now to FIG. 10 of the DRAWINGS, there is illustrated an assemblage of the aforedescribed container 100 and plug portion 120, the assembly generally designated by the reference numeral 160, as described in FIGS. 1-9 hereinabove for use in connection with a hydraulic system being purged, as described and illustrated hereinbelow.

It should be understood that the above exemplary components of the visual purge fluid containment and accumulation container 100 and plug portion 120, in combination 160, are pursuant to a preferred embodiment. It should, of course, be understood that alternate embodiments are envisioned here.

With reference now to FIG. 11 of the DRAWINGS, there is illustrated a representative configuration of a container in accordance with a second and presently preferred embodiment of an improved air/oil purge collection apparatus practicing the principles of the present invention. As with the embodiment shown in FIGS. 1-10, two interconnecting components are described. The configuration of the second container shown in this embodiment is generally designated by the reference numeral 200.

As with the alternate embodiment illustrated and described hereinabove, the component 200 has an annular bottom disk, generally designated by the reference numeral 202, and discussed in more detail hereinabove and hereinbelow. As shown, the component has an outer cylinder, generally designated by the reference numeral 204, discussed in more detail hereinabove and hereinbelow, where the outer cylinder 204 connects to the aforesaid annular bottom disk 202.

Also shown is an alternate top portion, generally designated by the reference numeral 236, which is configured to be sized to and atop the outer cylinder 204 and annularly attached thereto, as discussed in more detail hereinabove in connection with the first embodiment and also hereinbelow. In other words, the diameter of the top portion 236 is substantially the same as the diameter of the outer cylinder 204 and configured to affix thereto, preferably in the sleek cylindrical fashion as shown. It should be understood that the top portion 236 and outer cylinder 204 are securely attached to each other during operation. These parts, however, are detachable in another embodiment, e.g., a threaded interconnection, allowing easier container 200 cleaning.

Also shown in this embodiment are a number of rubber bumpers, generally designated by the reference numeral 238, disposed along the edges at both ends of the second container 200 to provide a cushion in case of a fall. Preferably, the rubber bumpers 238 are made of an oil resistant rubber or similar material inserted into a machined or otherwise formed to fit into a groove in the outside diameter of the upper end of the top portion 236 and the lower end of the outer cylinder 204 and likewise inserted into a machined or otherwise formed groove in the lower end of the bottom disk 202, as described in more detail hereinabove and hereinbelow.

It should be understood that the bumpers 238 are adhered to the upper end of the outer cylinder 204 and lower end of bottom disk 202 with no machining or forming of grooves in either the outer cylinder 204 or bottom disk 202.

With reference now to FIG. 12 of the DRAWINGS, there is illustrated another representative configuration of the container 200 in the second embodiment of an improved oil purge collection apparatus as shown in FIG. 11. As shown, the container 200 has an aperture, generally designated by the reference numeral 208, and discussed in more detail hereinbelow. Just as with the first embodiment container configuration 100, the aperture 208 is to receive the other second component described hereinbelow in connection with FIGS. 19-23. Also shown is a fluid drain aperture, generally designated by the reference numeral 240, discussed in more detail hereinbelow. For example, the user may after the purge is complete drain all of the collected fluids accumulated into the accumulation chamber 114/214 through the fluid drain aperture 240, which, of course, is in fluid communication with the accumulation chamber 114/214.

With reference now to FIG. 13 of the DRAWINGS, there is illustrated another representative configuration of the container 200 in the second embodiment of an improved oil purge collection apparatus shown and described in connection with FIGS. 11 and 12 hereinabove, taken along an underside perspective. As shown, the cylindrical outer cylinder 204 has an opening at an end thereof, as shown and generally designated by the reference numeral 210 and discussed in more detail hereinbelow, within which to receive the aforementioned hydraulic lift cylinder, such as at a garage.

With reference now to FIG. 14 of the DRAWINGS, there is illustrated another representative configuration of the container 200 in the second embodiment of an improved oil purge collection apparatus shown in FIGS. 11-13, oriented to view the container 200 from above in the end opening 210 of FIG. 13 looking down. As shown, the aperture 208 at the top of said top portion 236 is shown, as well as the upper bumper 238 and the aforementioned fluid drain aperture 240.

With reference now to FIG. 15 of the DRAWINGS, there is illustrated another representative configuration of the container 200 in the second embodiment, as shown in FIG. 14, which is a cross-sectional view of the component along the A-A line, bisecting the cylindrical structure. As shown in the cross-section and similar to the construction in the aforesaid first embodiment, the container 200 has an inner cylindrical structure, generally designated by the reference numeral 212, within the aforesaid outer cylinder 204, discussed in more detail hereinabove and hereinbelow.

Both the inner 212 and outer 204 cylinders are connected to the aforesaid annular bottom disk 202, as discussed in more detail herein, forming an accumulation chamber, generally designated by the reference numeral 214, therebetween and open at the other end, i.e., to receive residual oil during a purge, e.g., via a fluid entry aperture, generally designated by the reference numeral 242, in top portion 236 and to discharge oil via the aforesaid fluid drain aperture 240 in the top portion 236, e.g., after the purge has finished. As also shown in the cross-section, the container 200 has an annular lip seal, generally designated by the reference numeral 216, such as a rubber seal. The aforementioned inner cylinder 212 has a lip seal groove 118/218 therethrough, as shown in FIGS. 5 and 16, which receives the aforesaid lip seal 216 therein. It should be understood that the lip seal groove 218 is preferably machine formed into the top portion 236 in this embodiment.

As with the first embodiment, in another preferred embodiment, outer cylinder 204 and the top portion 236 are transparent, allowing a user to see therethrough, e.g., as oil accumulates within the accumulation chamber 214. In another preferred embodiment, the inner cylinder 212 is also transparent. See, e.g., FIGS. 25 and 26, as described in more detail hereinbelow.

With reference now to FIG. 16, which is an enlargement of a portion of FIG. 15, as designated therein, the aforementioned top portion 236 has an annular lip seal groove therethrough, generally designated by the reference numeral 218, which receives the aforesaid lip seal 216. The top portion 236 and lip seal groove 218 are referenced in enlarged FIG. 16 along with the aforementioned fluid drain aperture 240. Also shown is the aforesaid bumper groove 244, to receive the aforementioned rubber bumpers 238 serving to cushion the container configuration 200, e.g., in cleaning, from falls and such.

Also shown in FIGS. 15 and 16, as well as FIG. 5 hereinabove, are adhesive sealant locations, i.e., joinders of materials that require sealant to secure them properly, generally designated herein by the reference numeral 246. In FIG. 15, for example, the joinders of the inner 214 and outer 204 cylinders to the bottom disc 202 are secured with the aforementioned sealant 246 applied thereto, e.g., at least along annular junctures 246*a* and 246*b*, thereby sealing the bottom of the aforementioned accumulation chamber 214, as indicated by the arrows. In FIG. 16, when joining the outer cylinder 204 to the top portion 236 with adhesive sealant 246 at juncture 246*c*, as indicated by the arrows. Finally, sealant 246 is used to conjoin inner cylinder 212 to the top portion 236 at juncture 246*d*, as shown by respective arrows also.

With reference now to FIG. 17 of the DRAWINGS, there is shown the aforementioned apparatus 200 described hereinabove with a handle added, generally designated by the reference numeral 248, thereby providing another means to hold and position the device. It should be understood that the handle 248 is preferably affixed to the outer cylinder 204, e.g., using the aforesaid sealant 246, and does not interfere or interact with or compromise the aforementioned purge methodologies.

With reference to FIG. 18, this illustration shows an alternative embodiment of the instant invention, where components are manufactured conjoined, thereby not requiring glues or sealants. Indeed, this is an alternatively manufactured component, i.e., a one-piece accumulation chamber 214 fashioned by vacuum forming, thermoforming, or similar process, and generally designated by the reference numeral 250, thereby eliminating assembly of the aforementioned inner cylinder 112/212, bottom disk 102/202, and outer cylinder 104/204. The lift cylinder opening end would preferably also include the machined or formed groove 244 at the top end, as shown in the bottom disk 202 for the rubber bumper 238 or alternately the rubber bumper 238 could be a separately formed part adhered to the bottom of the tool 100/200/250.

With reference now to FIG. 19 of the DRAWINGS, there is illustrated the other component in the second embodiment of an improved oil purge collection apparatus, a plug portion, generally designated by the reference numeral 220, which is used with the aforesaid second container 200 shown hereinabove in connection with FIGS. 11-18 (and also with the embodiment shown in FIGS. 1-5).

As shown, the second component 220 has a socket portion, generally designated by the reference numeral 222, discussed in more detail hereinabove, where the socket portion is configured to tightly and securely insert into the aforesaid aperture 208 and extend therethrough to engage a bleed screw 364. As shown the socket portion 222 has a plurality of drain openings therethrough, generally designated by the reference numeral 224 discussed in more detail hereinabove and hereinbelow. Also, the component 220 has a handle portion 226 at the top, which a user may employ to insert, remove and manipulate the second component 220 during the purge process, as described.

With reference now to FIG. 20 of the DRAWINGS, there is illustrated a representative view of the component 220 shown in FIG. 19, the view looking perpendicularly downward on said handle portion 226. As shown, the handle portion 226 has a square aperture shown therein, generally designated by the reference numeral 228, and discussed and illustrated in more detail hereinabove.

It should be understood that the aperture 228, although shown herein as a square, may instead be pentagon, hexagonal or other configurations useful to manipulate the handle portion 226, e.g., by using a socket wrench or other tool to tighten or loosen the handle portion 226 (and hence the plug portion 220 to the aforementioned bleed screw). Inside said aperture 228, also shown in FIG. 21 (and also in FIG. 8), there is illustrated a sealant member, generally designated by the reference numeral 230, discussed in more detail hereinabove, which seals and separates the exterior space from the interior space, i.e., the space within the cylinders 212 and 204.

With reference now to FIG. 21 of the DRAWINGS, there is illustrated another representative configuration of the second component 220 in the embodiment shown in FIGS. 19 and 20, which is a cross-sectional view of the component along the B-B line illustrated, bisecting the second component 220, illustrating the aforementioned sealant member 230 at a midpoint therein. As shown in the cross-section, the second component 220 has a driving end, generally designated by the reference numeral 232, and a driven end, generally designated by the reference numeral 234, both discussed in more detail hereinabove. Drain openings 224 are also illustrated.

With reference now to FIG. 22 of the DRAWINGS, there is illustrated another representative and perspective view configuration of the second plug portion 220 in the embodiment shown in FIGS. 19-21, taken along a topside perspective, illustrating the round handle portion 226 with the square handle aperture 228, which is the driving end 232 of the tool 220. It should be understood that the size of the handle portion 226 should be sized to have a diameter larger than the aforementioned aperture 208 in order to cover and seal the hole during an air purge.

With reference now to FIG. 23 of the DRAWINGS, there is illustrated another representative and perspective view configuration of the second component 220 in the embodiment shown in FIGS. 19-20, taken along an underside perspective, again illustrating the sealant member 230 within the plug portion 220, and drain openings 224. Also, this is the driven end 234 of the tool 220, Again, the shape of the underside of the socket portion 222 is configured to engage at least said bleed screw 364.

With reference now to FIG. 24 of the DRAWINGS, there is illustrated an assemblage of the aforedescribed container 200 and plug portion 220 described in FIGS. 11-23 hereinabove for use in connection with a hydraulic system being purged, the assemblage generally designated by the reference numeral 260.

As discussed, although the second embodiment is the currently preferred embodiment of the invention, alternative configurations are indeed possible and contemplated by the inventor.

As mentioned, in a preferred embodiment of the instant invention, a variety of the parts of containers 100/200 and also top portions 106 and 236 should be transparent, thereby better allowing the visual inspection or observation of the current state of the oil, transmission or other fluid during the air or other purge.

With reference now to FIG. 25 of the DRAWINGS, there is shown a perspective view of the use of the improved air purge oil collection device pursuant to the teachings of the present invention in operation, generally designated by the reference numeral 300.

As shown, a variety of components in this embodiment are transparent, allowing the user to see what is happening inside, i.e., the air and any fluids purged. In particular, the outer cylinder, generally designated by the reference numeral 304, the inner cylinder, generally designated by the reference numeral 112/212, the top portion, generally designated by the reference numeral 336, and other components are substantially transparent or transparent. As also shown is an aperture 308 in the top portion 336 configured to receive a plug portion, as described herein.

As shown, oil, generally designated by the reference numeral 362, is shown, having been accumulated by the present invention and collected in an accumulation chamber 114/214, which is formed annularly between the outer cylinder 304 and inner cylinder 112/212, as described in detail hereinabove. At the top is shown a bleed screw, generally designated by the reference numeral 364, which when loosened allows air and fluids to release from within a hydraulic lift cylinder, generally designated by the reference numeral 366. The bleed screw 364 may be accessed through the aperture 308, as described hereinabove. As discussed, the hydraulic lift cylinder 366 may be similar to those employed at automobile shops and used to lift vehicles. Of course, the purging of these systems of air is a necessary and, as mentioned, messy, thing to do. By collecting the shed oil or other fluids during the air purge into the accumulation chamber 114/214, the purging process is made easier and cleaner.

With reference now to FIG. 26, there is shown the configuration 300 in FIG. 25 with the second component or plug portion, generally designated by the reference numeral 320, extending through the aforesaid aperture 308. As shown, the handle or head portion of the plug 320 substantially covers an aperture 108/208 at the top of the top portion 336, thereby helping to prevent spillage when the bleed screw 364 is loosened and the pressurized air/fluid admixture sprays outward. By turning the aforesaid plug portion 320, whether by hand or by a tool, as discussed, the bleed screw can be manipulated, perhaps to open it further, or slow the purge process down. The plug portion thus allows the user to govern the purge process, which the user monitors by virtue here of the transparency of the components. For example, if in the purge, the oil 362 accumulates too high, the device can be removed, the oil 362 poured out, perhaps using the aforesaid fluid drain aperture 240, and the device returned for more purging.

With reference now to FIG. 27 of the DRAWINGS, there is shown another variation on the design of the container 100 shown above, particularly the combined configuration 160 shown in FIG. 10. Here the cylindrical shape of the outer cylinder 104 is modified to incorporate a spout, generally designated by the reference numeral 152, by which the accumulated oil can easily be drained through a large opening, generally designated by the reference numeral 154.

In connection with the embodiments discussed herein, the various components have some other preferred aspects thereof. For example, the fluid containment inner cylinder 112/212 described hereinabove and hereinbelow preferably comprise a clear, opaque, or solid color plastic cylinder, of inside diameter dimension about 2.5" or 2.5 inch, of wall thickness dimension about 0.125", of finished length dimension about 5.75", and impervious to hydraulic oils and automatic transmission fluids. The ends of said fluid containment inner cylinder 112/212 are square cut or otherwise formed 90 degrees to the cylinder walls of said fluid containment inner cylinder 112/212, with the aforedescribed rubber lip seal groove 118 formed and positioned in the inside diameter of said fluid containment inner cylinder 112 (with lip seal groove 218 located in top portion 236) about 0.1" from an end, generally designated by the reference identifier 146*c* in FIG. 5, of said fluid containment inner cylinder 212.

With regard to the use of the aforesaid sealant 146/246, a continuous bead of a compatible adhesive sealant is evenly distributed on an end, generally designated by the reference identifier 146*a*, in FIG. 5, face of said fluid containment inner cylinder 112/212 to secure permanent attachment, bonding, and sealing to a fluid containment bottom disc 102/202. When properly assembled, the centerline of said fluid containment inner cylinder 112/212 aligns with the diameter center point of said fluid containment bottom disc 102/202 consequently, the inside diameter surface of said fluid containment inner cylinder 112/212 aligns with the inside diameter surface of said fluid containment bottom disc 102/202.

The fluid containment bottom disc 102/202 comprises a disc of an outside diameter dimension about 3.5" concentric to an inside diameter dimension about 2.5" opening cut or similarly fashioned from about 0.125" thickness dimension sheet which is impervious to hydraulic oils and automatic transmission fluids.

The fluid containment outer cylinder 104/204 preferably comprises a clear plastic cylinder of outside diameter dimension about 3.5", of wall thickness about 0.125" of finished length dimension about 6", and impervious to hydraulic oils and automatic transmission fluids. Ends of said fluid containment outer cylinder 104/204 are square cut 90 degrees to the cylinder walls of said fluid containment outer cylinder 104/204.

A continuous bead of a compatible adhesive sealant is evenly distributed on an end face. Generally designated by the reference identifier **146*b* in FIG. 5, of said fluid containment outer cylinder 104/204 to secure permanent attachment, bonding, and sealing to a fluid containment bottom disc 102/202, which being previously assembled to a fluid containment inner cylinder 112/212. When said fluid containment outer cylinder 104/204 is properly assembled to a previously assembled fluid containment bottom disc 102/202 and fluid containment inner cylinder 112/212, said fluid containment inner cylinder 112/212 resides inside and within the confines of said fluid containment outer cylinder 104/204 of the container component 100/200** described herein.

Further, the centerline of said fluid containment outer cylinder 104/204 preferably aligns with the centerline of said fluid containment inner cylinder 112/212, consequently, the outside surface of said fluid containment outer cylinder 104/204 aligns with the outside diameter surface of said fluid containment bottom disc 102/202.

The fluid containment top cone 106 preferably comprises an about 1.25" in height dimension cone cut, shaped, formed, or otherwise fashioned and fabricated from about. 0.125" thick clear plastic sheet, which is impervious to hydraulic oils and automatic transmission fluids. The top portion 236 may be similarly constructed. The base outside diameter dimension of said fluid containment top cone 106 or top portion 236 is about 3.5" and having a bleed screw socket insertion opening 108/208 diameter dimensions of about 1" formed by cutting, drilling, or similar fashion in the apex of said fluid containment top cone 106 or top cone portion 236 of the instant invention.

For example, a continuous bead of compatible adhesive sealant is evenly distributed on the bottom surface of said fluid containment top cone 106 or top portion 236 to secure permanent attachment, bonding, and sealing to end, generally designated by the reference identifier **146*c* in FIG. 5, of said fluid containment outer cylinder 104/204, which having been previously assembled to said fluid containment bottom disc 102/202, which being previously assembled to said fluid containment inner cylinder 104/204. The top portion 236** may be similarly glued.

When properly assembled, the diameter center point of said fluid containment top cone 106 or top portion 236 bleed screw socket insertion opening or aperture 108/208/308 will be in alignment with centerlines of previously assembled said fluid containment inner cylinder 112/212 and said fluid containment outer cylinder 104/204, consequently attaining alignment of the outside diameter surface of said fluid containment top cone 106 or top portion 236 with the outside diameter surface of said fluid containment outer cylinder 104/204.

The rubber lip seal 116/216 comprises a rubber lip seal impervious to hydraulic oils and automatic transmission fluids of which the sealing lip inside diameter being of sufficient dimension to facilitate insertion of the single acting hydraulic lift cylinder to create a seal between the lip of said rubber lip seal 116/216 and the outside diameter of the single acting hydraulic lift cylinder without permanent deformation or damage to said rubber lip seal 116/216. Said rubber lip seal 116/216 outside diameter and thickness is of sufficient dimension to facilitate insertion in and sealing to said rubber lip seal groove 118/218 in said fluid containment inner cylinder 112/top portion 236. Said rubber lip seal 116/216 resides in said rubber lip seal groove 118/218 in the top end of said fluid containment inner cylinder 112/top portion 236 oriented such that the lip of said rubber lip seal 116/216 protrudes from the top of said fluid containment inner cylinder 112/top portion 236. Said rubber lip seal 116/216 is a replaceable item and therefore is not permanently fitted in said rubber lip seal groove 118/218 in said fluid containment inner cylinder 112/top portion 236, as discussed hereinabove.

The rubber lip seal groove 118/218 comprises a groove formed and residing along the inside diameter of said fluid containment inner cylinder 112/top portion 236 end **146*c*. Said rubber lip seal groove 118/218 is formed in the inside diameter of said fluid containment inner cylinder 112/top portion 236 about 0.1" distance from end 146*c* of said fluid containment inner cylinder 112/top portion 236 to accommodate and retain said rubber lip seal 116/216. Dimensions of said rubber lip seal groove 118/218 are derived from said rubber lip seal 116/216 thickness and outside diameter dimensions and the centerline alignment of said rubber lip seal groove 118/218 aligns with centerline of said fluid containment inner cylinder 112/top portion 236**.

The bleed screw socket insertion opening or aperture 108/208 comprises an about 1" diameter opening cut, drilled, or otherwise fashioned in the center of the apex of said fluid containment top cone 106 or top portion 236.

The single acting hydraulic lift cylinder aperture or bottom opening 110/210 comprises an aperture and void providing means of single acting hydraulic lift cylinder 366 insertion into said visual purge fluid containment and accumulation device. As shown, the aperture 110/210 begins at the inside diameter of the center opening of an assembled said fluid containment bottom disc 102/202 and the void extends unobstructed through the inside diameter of an assembled fluid containment inner cylinder 112/212, subsequently terminating in the inside diameter of the said rubber lip seal 116/216.

It should be understood that the lift cylinder 366 may have different outside diameters. Thus, the apertures 110/210 described hereinabove must be configured to receive the cylinders 366 for the purge. For example, normal hydraulic cylinders 366 have an outside diameter of about 2 and 3/8 inches or 2.375 inches, which is the current prevalent size.

It should also be understood that additional and smaller/larger sizes may be accommodated. For example, another hydraulic lift cylinder out there has an outer diameter of about 2 and 29/32 inches or about 2.906 inches. For this and other larger sizes, as well as cylinder sizes smaller, adaptors may be employed, which would also allow for lip seals 116/216 fitting a range of diameters.

The instant invention thus covers a variety of actual and possible diameters for the hydraulic lift cylinders and other such devices, e.g., a range from 1 to 6 inches, a more preferred range of 2 to 4 inches, a range of 2 to 3 inches, and most preferred measurements of 2.375 and 2.906 as described.

As discussed, the general size of a bleed screw 364 in current operation are about 5/8 inch, particularly a 5/8-inch hex head, which must securely engage the socket engagement portion of the aforedescribed plug portion 120/220/320. In addition to a general hex head configuration or six-sided screw head, the bleed screw 364 could have a torx head, also known as a star head, for engagement, which can alternatively be inverted, and of variable length, as is understood to those of skill in this art.

The fluid containment and accumulation chamber 114/214 comprises an area or void within a completely assembled visual purge fluid containment and accumulation device or container 100/200/300. Said fluid accumulation and containment chamber 114/214 is formed by properly assembling a fluid containment inner cylinder 112/212, a fluid containment bottom disc 102/202, a fluid containment outer cylinder 104/204, a fluid containment top cone 106 or top portion 236, and a rubber lip seal 116/216, resulting in a volumetric fluid capacity of said fluid containment and accumulation chamber 114/214 of not less than about five fluid ounces.

The bleed screw operation socket assembly or plug portion 120/220 preferably comprises a steel bleed screw operation socket 122/222, a quantity of sealant 130/230, a quantity of drain openings 124/224, and a bleed screw operation socket handle portion 126/226, when properly formed, machined, and permanently assembled comprise said bleed screw operation socket assembly 120/220.

The bleed screw operation socket 120/220 preferably comprises an off-the-shelf, readily available about ⅜" standard square drive about ⅝" six-point steel deep well socket, an adequate quantity of said sealant 130/230, and a quantity of six said drain openings 124/224. The about ⅜" drive end 132/232 of said bleed screw operation socket 122/222 is isolated and scaled from the about ⅝" driven end 134/234 of said bleed screw operation socket 122/222 by implementation of a sufficient quantity of hydraulic oils and automatic transmission fluids resistant said sealant 130/230 on the inside of said bleed screw operation socket 122/222.

Also, a quantity of six about 0.125" diameter evenly spaced said drain openings 124/224 are drilled, punched, or otherwise formed in the perimeter wall of said bleed screw operation socket 122/222 at a measured distance of about 0.375" from said about ⅝" driven end 134/234 of said bleed screw operation socket 122/222.

A quantity of sealant 130/230 is employed, preferably comprising a hard-curing hydraulic oils and automatic transmission fluids epoxy or similar substance injected or similarly placed inside said bleed screw operation socket 122/222. Said sealant 130/230, as well as sealant 146/246 described elsewhere herein, is of sufficient quantity and precise placement within said bleed screw operation socket 120/220 to isolate said ⅜" drive end 132/232 of said bleed screw operation socket 122/222 from said ⅝" driven end 134/234 of said bleed screw operation socket 122/222. Said sealant 130/230 further being of minimal quantity and precise placement to eliminate hinderance of both insertion of an about ⅜" drive tool (not included) into said about ⅜" drive end 132/232 of said bleed screw operation socket 122/222 and placement of said bleed screw operation socket 122/222 said about ⅝" driven end 134/234 on a single acting hydraulic lift cylinder bleed screw.

Further, a quantity of drain openings 124/224 employed preferably comprise a quantity of six about 0.125" diameter dimension drilled, punched, or similarly formed openings in said bleed screw operation socket 122/222 wall at a distance dimension measuring about 0.375" from said about ⅝" driven end 134/234 of said bleed screw operation socket 122/222.

The bleed screw operation handle 126 (shown cross shaped) and 226 (round or washer shaped) comprises an about 0.125" in dimensional thickness steel cross of equal about 1.5" dimension extensions welded, brazed, or similar method of permanent attachment to said about ⅜" drive end 132/232 of said bleed screw operation socket 122/222. Said bleed screw operation socket handle 126/226 is positioned and attached to said bleed screw operation socket 122/222 to permit insertion of a suitable about ⅜" square drive tool (not supplied) into said about ⅜" drive end 132/232 of said bleed screw operation socket 122/222.

Some further observations about the invention are set forth below.

Each component and dimension of this invention is preferably designed, fabricated, and assembled to function together for use in a close quarter limited access area. The visual purge fluid containment and accumulation device combination is compact and durable, and its fluid capacity is sufficient considering the application for which it is designed and adds elements of safety, time savings, cost savings, cleanliness, and environmental friendliness to the air purge process. The design of the bleed screw operation socket assembly 120/220/320, connecting to the container 100/200/300, enhances close quarter use by its hand operation capability as well as aiding in directing oil into the fluid containment and accumulation chamber 114/214. The rubber lip seal 116/216 placement in this invention helps to direct the oil flow into the fluid containment and accumulation chamber 114/214 and is replaceable should it become damaged.

Possible design, fabrication, and application variations:

The plastic components of the visual purge fluid containment and accumulation device 160/260 could be fabricated using a forming or molding process or processes.

The visual purge fluid containment and accumulation container 100/200/300 dimensions can vary to accommodate additional applications or to increase fluid containment volume.

The visual purge fluid containment and accumulation container 100/200/300 could be fabricated using interchangeable components for versatility.

The visual purge fluid containment and accumulation container 100/200/300 could incorporate a drain, valve, or similar opening to facilitate draining.

A positive positioning device could be incorporated into the visual purge fluid containment and accumulation container 100/200/300 to facilitate positioning of the device on the single acting hydraulic cylinder.

It should be understood that the instant invention can be used in other air purge applications, where the features herein can be adapted thereto and would be beneficial.

With modification, this invention could be used on other than vertically mounted single acting hydraulic cylinders in positions varying between vertical and horizontal.

The bleed screw operation socket assembly or plug portion 120/220/320 could be a one-piece fabricated item.

The bleed screw operation socket assembly or plug portion 120/220 can be formed or fabricated of plastic for only hand use. It should be understood that a separate socket would be needed to be used to initially loosen and finally tighten the bleed screw 364.

A standard ⅜" drive ⅝" socket could be used in place of the bleed screw operation socket assembly 120/220 resulting in lessened functionality. Since the likely result would be spilled oil and bodily contact with the oil, this approach is not preferred.

The bleed screw operation socket handle 126/226 could be more ergonomically designed than shown in the drawings before production.

Different bleed screw operation socket assembly 120/220 configurations will need to be fabricated due to differences in single acting hydraulic cylinder bleed screw sizes and designs.

Further observations about the invention.

The visual purge fluid containment and accumulation container 100/200/300 and the bleed screw operation socket assembly 120/220/320 work together to cause the invention to optimally function as designed, desired, and intended. Correct positioning of the visual purge fluid containment and accumulation device or container 100/200/300 on a single acting hydraulic lift cylinder 366 in conjunction with the insertion and use of the bleed screw operation socket assembly 120/220/320 shields the user from escaping oil during the air purge process enabling the invention user to safely view, contain, and evaluate the escaping oil for air content and subsequently accumulate and dispose of the oil in an environmentally proper and safe manner. The use of the bleed screw operation socket 120/220/320 in conjunction with the visual purge fluid containment and accumulation container 100/200/300 further ensures safer, faster, and easier air bleed operation and complete oil containment and accumulation.

This invention shields the user and the surrounding area from escaping oil and containment and accumulation of virtually all the oil which escapes through the bleed screw 364 during the air purge process, only a residual amount of oil remains on the end of the single acting hydraulic lift cylinder 366 which would require absorption and disposal.

Operations of the visual purge containment and accumulation device of the present invention include the following exemplary steps.

For the first component 100/200/300:

Step 1: Insert a rubber lip seal 116/216 into the rubber lip seal groove 118/218 in the fluid containment inner cylinder 112/212. Orient the rubber lip seal 116/216 lip to protrude from the aforementioned end 146*d* of the fluid containment inner cylinder 112/top portion 236.

Step 2: Attach end 246*a* of the fluid containment inner cylinder 112/212 to a fluid containment bottom disc 102/202 aligning the inside diameters of the fluid containment inner cylinder 112/212 and the fluid containment bottom disc 102/202.

Step 3: Attach end 246*b* of a fluid containment outer cylinder 104/204 to the fluid containment bottom disc 102/202 aligning the outside diameters of the fluid containment outer cylinder 104/204 and the fluid containment bottom disc 102/202.

Step 4: Attach a fluid containment top cone 106 or top portion 236 to the end 246*c* of the fluid containment outer cylinder 104/204 aligning the outside diameters of the fluid containment top cone 106 or cone portion 236 and the fluid containment outer cylinder 104/204.

For the bleed screw operation socket assembly 120/220:

Step 1: Drill 6 equally spaced about 0.125" diameter drain openings 124/224, holes around the circumference of the bleed screw operation socket 122/222, about 0.375" from the about ⅝" driven end 134/234, removing any metal burrs or shavings.

Step 2: Fabricate a bleed screw operation socket handle 126/226 from a suitable about 0.125" thickness flat steel plate.

Step 3: Weld the bleed screw operation socket handle 126/226 to the about ⅜" drive end 132/232 of the bleed screw operation socket 122/222 such that the about ⅜" drive end 132/232 opening remains unobstructed.

Step 4: Inject a suitable amount of sealant 130/230 into the inside of the bleed screw operation socket 122/222 near the midpoint of sufficient quantity to prevent hydraulic oil or automatic transmission fluid passage between the about ⅝" driven end 134/234 and the about ⅜" drive end 132/232 of the bleed screw operation socket 122/222 such that the about ⅜" drive end 132/232 opening, the about ⅝" socket driven end 134/234 opening, and the drain openings 124/224 remain unobstructed.

Further operational aspects in combining the two components include the following.

Slide the visual purge fluid containment and accumulation device 100/200 over the bleed screw 364 end of the single acting hydraulic lift cylinder 366 to engage the rubber lip seal 116/216 and seal the visual purge fluid containment and accumulation device 100/200 to the single acting hydraulic lift cylinder 366. Insert the ⅝" driven end 134/234 of the bleed screw operation socket assembly 120/220 through the bleed screw socket insertion opening 108/208 in the top of the visual purge fluid containment and accumulation device 100/200 to contact and operate the single acting hydraulic lift cylinder bleed screw 364. Insert a suitable ⅜" drive tool (not supplied) into the ⅜" drive end 132/232 of the bleed screw operation socket assembly 120/220 to engage and loosen the single acting hydraulic lift cylinder bleed screw 364.

After loosening the bleed screw 364, remove the ⅜" drive tool (not supplied) from the bleed screw operation socket assembly 120/220 and use the bleed screw operation socket handle 126/226 to operate the single acting bleed screw 364 during the hydraulic cylinder air purge process, along with any residual oil collected during that air purge.

When the oil level in the fluid containment and accumulation chamber 114/214 of the visual purge fluid containment and accumulation device 160/260 rises and nears being full, remove the bleed screw operation socket assembly 120/220 from the visual purge fluid containment and accumulation device 160/260 and set it aside.

Then slide up and remove the visual purge fluid containment and accumulation device 100/200 from the single acting hydraulic lift cylinder and empty the accumulated oil via the bleed screw socket insertion opening 108 or the aforementioned fluid drain aperture 240 in the top of the visual purge fluid containment and accumulation device 100/200 and dispose of the oil properly. Alternatively, draining can be through the aforementioned spout 152, as shown in FIG. 27 here the residual oil first drains from the socket opening 108 or through the fluid drain aperture 240, as described, then guided through the spout 152.

When the visual purge fluid containment and accumulation container 100/200/300 is removed from the single acting hydraulic lift cylinder 366, a residual amount of oil will remain on the bleed end of the single acting hydraulic lift cylinder 366 that will need to be absorbed with a rag or other absorbent cloth. Remove, drain, and replace the visual purge fluid containment and accumulation container 100/200/300 and continue air purging as necessary during the process to obtain the necessary cleaning state.

After it has been determined that all the air has been purged from the single acting hydraulic lift cylinder, insert a suitable ⅜" drive torque wrench (not supplied) into the ⅜" drive end 132/232 of the bleed screw 364 operation socket assembly 120/220/320 and torque the single acting hydraulic cylinder bleed screw 364 to the torque specification listed by the manufacturer of the automotive lift that is being serviced.

After the bleed screw has been torqued, remove the bleed screw operation socket assembly 120/220/320 from the visual purge fluid containment and accumulation container 100/200/300. Then, remove the visual purge fluid containment and accumulation container 100/200/300 from the single acting hydraulic lift cylinder and empty the oil contained inside the visual purge fluid containment and accumulation device 160/260 via the bleed screw socket insertion opening 108/208/308 in the top of the visual purge fluid containment and accumulation container 100/200/300 and dispose of the oil properly. A residual amount of oil will remain around the bleed screw 364 of the single acting hydraulic lift cylinder 366, the small amount of which will need to be absorbed with a rag or other absorbent cloth and disposed of properly.

The visual purge fluid containment and accumulation container 100/200/300 and the bleed screw operation socket assembly 120/220/320 are both necessary and integral components of this invention to achieve optimal operational results. Neither component is optional.

An optional modification of the visual purge fluid containment and accumulation container 100/200/300 could be to provide a means of draining oil from the visual purge containment and accumulation container 100/200/300 while the device remains in place on a single acting hydraulic lift cylinder 366 could be beneficial.

This modification to the visual purge fluid containment and accumulation container 100/200/300 could include, but not limited to, an opening with a removable drain plug, a hose barb to attach a drain hose or tubing, or a ball valve or similar drain flow control device.

Although an exemplary embodiment with exemplary measurements is shown and described hereinabove, alternate configurations and measurements are envisioned and within the skill of one of ordinary skill in the art.

This invention could be used on other single or double acting hydraulic cylinder applications where air purging is necessary.

The shape and accumulation capacity of this invention could vary depending on the available space surrounding the hydraulic cylinder.

The shape of this invention could vary to accommodate hydraulic cylinders installed in positions other than vertical.

This invention with modification could be used to purge air from hydraulic system components other than cylinders.

This invention's visual purge fluid containment and accumulation container 100/200/300 could incorporate a drain opening and plug, drain valve, or hose barb connection to attach a hose or tubing to facilitate draining of the visual purge fluid containment and accumulation container 100/200/300 while remaining positioned on the single acting hydraulic lift cylinder.

This invention could incorporate a positioning stop in the visual purge fluid containment and accumulation container 100/200/300 to precisely position the visual purge fluid containment and accumulation container 100/200/300 on the single acting hydraulic lift cylinder 366. This positioning stop would keep the single acting hydraulic cylinder 366 from being placed too far into the device.

This invention could be designed with interchangeable parts and components to facilitate this invention's usage on multiple diameters of hydraulic cylinders if the hydraulic cylinder this invention is to be used on is in a space that would facilitate the use of a larger or oversize version of this invention.

The plastic components of the visual purge fluid containment and accumulation container 100/200/300 could be fabricated utilizing a molding and forming process and then assembled or a process that utilizes a molding and forming process that requires no assembly.

With limited functionality, this invention's bleed screw operation socket assembly or plug portion 120/220/320 could be a one-piece molded plastic component. This would limit the functionality because it could not be used to initially loosen or finally tighten the single acting hydraulic cylinder bleed screw.

This invention can be used in applications other that on single acting hydraulic lift cylinders 366 on above ground hydraulically operated lifts. This invention with or without design, fabrication, and dimensional modification(s) can possibly be used in other applications where a single or double acting hydraulic cylinder 366 requires the purging of air from the cylinder and visual access to the escaping oil is vital and/or escaping purge oil is a containment problem.

This invention possibly could also be used with or without design, fabrication, and dimensional modification(s) on other hydraulic system components other than hydraulic cylinder for purposes of air purging or bleeding.

The previous descriptions are of preferred embodiments for implementing the invention, and the scope of the invention should not necessarily be limited by these descriptions. It should be understood that various alternatives and equivalents are encompassed herein. The scope of the current invention is defined by the following claims.

What is claimed is:

1. A device for hydraulic purging comprising:

an outer cylinder;

an annular bottom, said outer cylinder and said annular bottom being concentrically aligned and said outer cylinder being secured at one end to said annular bottom;

an inner cylinder, said inner cylinder configured to fit concentrically within said outer cylinder and secured to said annular bottom, an accumulation chamber being formed between said inner cylinder and said outer cylinder, said accumulation chamber configured to receive and contain fluids therein, a top, said top having an annular base of said diameter, said top secured along said outer cylinder at the other end thereof and along a periphery thereof, said top having a top aperture therethrough, a plug, said plug having an engaging portion engaging said top aperture and extending therethrough, said plug having a handle, said plug having an opening at a top portion thereof configured for engaging a tightening tool, said plug along a lower portion thereof having a plurality of drain holes, whereby said device is configured to receive an external hydraulic system for air and other purging through and within said inner cylinder.

2. The device for hydraulic purging according to claim 1, wherein at least one component is made of a transparent material, said component selected from the group consisting of said inner cylinder, said outer cylinder, and top, and combinations thereof.

3. The device for hydraulic purging according to claim 1, further comprising at least one bumper along an edge, thereby helping to prevent damage to said device if dropped.

4. The device for hydraulic purging according to claim 3, wherein said bumper is made of a rubber material.

5. The device for hydraulic purging according to claim 1, wherein said top comprises a cylinder of said diameter said top configured to secure to said outer cylinder.

6. The device for hydraulic purging according to claim 5, wherein said top having a fluid drain aperture.

7. The device for hydraulic purging according to claim 5, wherein said device has two bumpers along two periphery edges of said device.

8. The device for hydraulic purging according to claim 1, wherein said top comprises a tapered cone with a base portion thereof of said diameter, said top along said base portion configured to secure to said outer cylinder.

9. The device for hydraulic purging according to claim 1, further comprising a handle, said handle configured to secure to said outer cylinder, whereby a user can pick up the device by said handle and empty said device of any fluids in said accumulation chamber through a fluid drain aperture.

10. The device for hydraulic purging according to claim 9, wherein said outer cylinder is configured to include a portion thereof as a spout, whereby a user can pick up the device by said handle and empty said device of any fluids in said accumulation chamber through said spout.

11. A device for hydraulic purging according to claim 1, wherein said socket portion extending through said top aperture is configured to engage a bleed screw of an external hydraulic system within said inner cylinder.

12. The device for hydraulic purging according to claim 11, wherein, when a user opens said bleed screw, pressurized contents within said external hydraulic system enter said device, fluids being collected within said accumulation chamber.

13. The device for hydraulic purging according to claim 11, wherein said engaging portion of said plug engages a ⅝-inch hex head portion of said bleed screw.

14. The device for hydraulic purging according to claim 1, wherein said inner cylinder, outer cylinder and annular bottom are a unitary construction.

15. The device for hydraulic purging according to claim 1, wherein said inner cylinder is configured to receive an external hydraulic system therein, the diameter of said inner cylinder having a diameter range of 1 to 6 inches.

16. The device for hydraulic purging according to claim 15, wherein said diameter range is selected from the group consisting of 2 to 4 inches, 2 to 3 inches, 2.375 inch, and 2.906 inch.

17. A system for hydraulic purging comprising:
- a hydraulic lift cylinder; and
- a device, said device comprising:
  - an outer cylinder;
  - an annular bottom, said outer cylinder and said annular bottom being concentrically aligned and said outer cylinder being secured at one end to said annular bottom;
  - an inner cylinder, said inner cylinder configured to fit concentrically within said outer cylinder and secured to said annular bottom, an accumulation chamber being formed between said inner cylinder and said outer cylinder, said accumulation chamber configured to receive fluids therein,
  - a top, said top having an annular base of said diameter, said top secured along said outer cylinder at the other end thereof and along a periphery thereof, said top having a top aperture therethrough,
  - a plug, said plug having an engaging portion engaging said top aperture and extending therethrough,
  - said plug along a lower portion thereof having a plurality of drain holes,
  - said device configured to receive an external hydraulic system for air and other purging.

18. A kit for hydraulic purging comprising:
- at least one device, said device comprising:
  - an outer cylinder;
  - an annular bottom, said outer cylinder and said annular bottom being concentrically aligned and, said outer cylinder being secured at one end to said annular bottom;
  - an inner cylinder, said inner cylinder configured to fit concentrically within said outer cylinder and secured to said annular bottom, an accumulation chamber being formed between said inner cylinder and said outer cylinder, said accumulation chamber configured to receive fluids therein,
  - a top, said top having an annular base of said diameter, said top secured along said outer cylinder at the other end thereof and along a periphery thereof, said top having a top aperture therethrough,
  - a plug, said plug having an engaging portion engaging said top aperture and extending therethrough,
  - said plug along a lower portion thereof having a plurality of drain holes,
  - said at least one device configured to receive respective external hydraulic systems for air and other purging.

19. A method for hydraulic purging comprising:
- engaging a purge device on an external hydraulic system requiring a purge,
- said device having an inner cylinder and an outer cylinder, concentrically aligned and secured to an annular bottom at one end, forming an accumulation chamber therebetween, a top secured to the other end of aid outer cylinder and having an aperture therethrough, a plug configured to secure to a bleed screw of said external hydraulic system through said aperture, said external hydraulic system fitting into said inner cylinder;
- engaging, by said plug, said bleed screw, opening said external hydraulic system for purging;
- accumulating, within said accumulation chamber, fluids during said purging; and
- draining said purge device of said fluids.

20. The method according to claim 19, wherein during said step of accumulating, a user is able to observe the purging due to at least one of said inner cylinder, said outer cylinder and said top being made of a transparent material.

* * * * *